Aug. 3, 1937.  I. R. VALENTINE  2,089,080
VEHICLE BRAKE
Filed Nov. 7, 1935

Inventor:
Irving R. Valentine,
by Harry E. Dunham
His Attorney.

Patented Aug. 3, 1937

2,089,080

UNITED STATES PATENT OFFICE 2,089,080

VEHICLE BRAKE

Irving R. Valentine, Erie, Pa., assignor to General Electric Company, a corporation of New York Application November 7, 1935, Serial No. 48,660

12 Claims. (Cl. 188—73)

The present invention relates to motor vehicle brakes and more particularly to brakes adapted for use on heavy vehicles such as busses, trucks and the like.

In my copending patent application Serial No. 737,722, filed July 31, 1934, and entitled "Friction material" of which the present application is a continuation in part, I have disclosed an improved friction material suitable for use as a brake drum or brake lining. The friction material disclosed in my prior application may be employed to advantage as a brake lining in combination with cast iron or steel brake drums or in combination with a brake drum consisting of like friction material. It may also be employed to advantage as a brake drum in contact with the well known types of fibre brake linings.

If a brake lining consisting of the friction material disclosed in my prior patent application and a cooperating cast iron or steel brake drum is employed on heavy vehicles, such as busses or heavy trucks, the wear on the drum may be excessive.

One of the objects of the present invention is to provide a long life efficient brake which is adapted for use on heavy motor vehicles.

A further object of my invention is to provide, in combination with my improved friction material, a brake member which is very resistant to wear.

Figure 1:
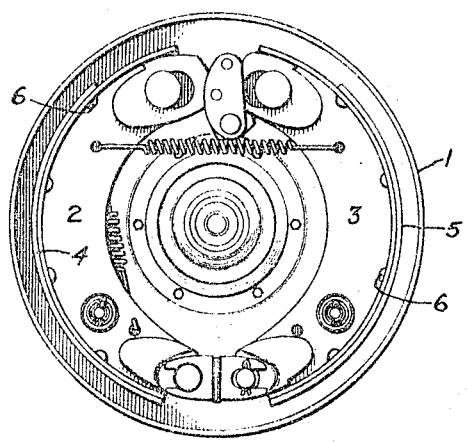
Figure 2:
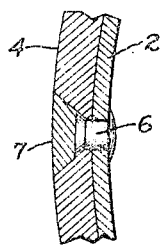

The novel features which are characteristic of my invention are set forth with particularity in the appended claims. My invention itself however will best be understood from reference to the following specification when considered in connection with the accompanying drawing in which Fig. 1 is a view in elevation of an automobile brake consisting of a drum and cooperating brake shoes, while Fig. 2 is a cross sectional detail view on an enlarged scale, of a portion of a brake shoe provided with a brake lining consisting of my improved metal friction material.

Referring more particularly to the drawing, I have indicated at 1 a steel brake drum embodying features of the present invention and cooperating with brake shoes 2 and 3. The latter are provided respectively with metallic brake linings 4 and 5. In securing the metal brake lining to the brake shoes the lining is countersunk at various portions thereof and then riveted to the brake shoe by means of rivets 6. It is desirable to fill the countersunk portions of the brakeband with metal 7 to prevent any powdered metallic material from collecting therein. This may be accomplished by means of an atomic hydrogen welding torch employing a welding rod consisting substantially of the same ingredients as the brake linings 2 and 3 and in addition about 1% of phosphorus. If desired however other metals or alloys which are relatively soft or have about the same degree of hardness as the linings 4 and 5 may be employed to fill the countersunk portions of the brakeband.

The friction material disclosed in my prior application, Serial No. 737,722 contains about 70 to 85% copper, about 6 to 15% lead, about 2 to 10% tin, about 1 to 4% nickel, about 1 to 4% silicon and from 0 to about 3% zinc. For the most satisfactory results the lead content should be between about 8 to 12%, the tin from about 3 to 9%, the nickel and silicon each from about 1 to 3%, and the zinc from about ½% to 2%. A small amount of iron, for example up to about 1%, will generally be present in the alloy although iron is not intentionally included.

In fabricating my improved friction material the ingredients may be melted in a furnace and cast to a desired shape in a suitable mold, a small quantity of phosphorus, i. e. about 0.1%, being added in the ladle to improve fluidity as well as to deoxidize the melt and refine the grain of the alloy. If desired, the alloy may be made by pressing and sintering the mixed powdered ingredients instead of casting, the sintering temperature varying from about 550° C. to a temperature just below the melting point of the mixture.

If the friction material is cast the casting is heat treated at a temperature between about 500° C. to 800° C. for a period of about two hours or more after which it is cooled preferably without quenching. Although the temperature of the heat treatment may be varied, I prefer to employ a temperature of about 600° C. This temperature is maintained for about 6 to 8 hours. If temperatures above 600° C. are employed the heating period will be shortened. For example, at 700° C. the heating period will have a duration of about two hours.

The coefficient of friction of my improved friction material is about 0.6% and is substantially constant at temperatures up to and above 500° C. although it may rise slightly at higher temperatures.

Although I prefer to employ in my friction material all the ingredients as heretofore indicated, it is possible to obtain a satisfactory braking action if certain of the elements are omitted. If the nickel and silicon are omitted from the alloy the lead content and zinc content should be increased. For example, the alloy under such conditions preferably should contain from about 70 to 85% copper, about 6 to 12% lead, about 4 to 8% tin and about 2 to 4% zinc. A small quantity of aluminum or manganese, for example 0.1% to 1.5% manganese or aluminum, preferably manganese, may be added to the above mixture.

If my improved friction material is employed on very heavy motor vehicles as a brake lining in contact with the usual cast iron or high carbon steel brake drums, the wear on such drums may be excessive, for example more than 0.004 inch per thousand miles, and the brake drums in addition will usually develop heat checks. I have found however that if my improved friction material is employed as a brake lining against a high speed steel brake drum having the property of red hardness that the wear on the drum is greatly reduced. By red hardness I mean a material having strength and hardness at red heat. This property will usually be found in high speed steels containing appreciable quantities of metal of the sixth group of Mendelejeff's Periodic Table of elements. The best results however are obtained with high speed steels having from about 4% to about 22% of such metal of the sixth group.

A steel containing 1.3% carbon, 3.50% tungsten, 0.3% manganese, 0.45% silicon and hardened to about 600 Brinell will show a wear of 0.00416 inch per thousand miles in contact with my improved friction material. This steel possesses a certain amount of red hardness but the quantity of tungsten or sixth group metal is too low to give the most satisfactory results. On the other hand, a high speed steel containing 0.60% carbon, 18% tungsten, 4% chromium, 1% vanadium and hardened to about 400 Brinell showed no heat checks whatever and a wear of 0.0016 inch per thousand miles, while a high speed steel hardened to about 500 Brinell containing 0.60% carbon about 7.5% to 8.5% molybdenum, about 1.25% to 2% tungsten, about 3.5% to 4% chromium about 1 to 1¼% vanadium and fractional percentages of manganese and silicon showed no heat checks and a wear of only 0.0007 inch per thousand miles. Both steels, especially the latter, have a high degree of red hardness.

Although I have illustrated my invention in connection with a brake lining consisting of my improved friction material, it will be observed that the relation of the brake lining and drum may be reversed and my improved friction material may, if desired, comprise a brake drum in cooperation with a high speed steel brake lining.

What I claim as new and desire to secure by Letters Patent of the United States, is:

1. A brake comprising cooperating friction members, one of said members comprising a copper alloy containing at least about 70% of copper and the other member comprising a high speed steel having the property of red hardness.

2. A brake comprising cooperating members, one of said members comprising a copper alloy heat treated at a temperature in the neighborhood of 500 to 800° C. and containing at least about 70% of copper, and the other member comprising a high speed steel having the property of red hardness.

3. A brake comprising cooperating members, one of said members comprising an alloy containing about 70 to 85% copper, about 6 to 15% lead, about 2 to 10% tin, about 1 to 4% nickel, about 1 to 4% silicon, and about 0.5 to 2% zinc, the other member comprising a high speed steel containing from about 4% to 20% of metal from the group consisting of tungsten, molybdenum and chromium.

4. A brake comprising cooperating members, one of said members comprising an alloy containing about 70 to 85% copper, about 6 to 15% lead, about 2 to 10% tin, about 1 to 4% nickel, about 1 to 4% silicon, and about 0.5 to 2% zinc, the other member comprising a high speed steel containing about 0.60% carbon, about 18% tungsten, about 4% chromium and about 1% vanadium.

5. A brake comprising cooperating members, one of said members comprising an alloy containing about 70 to 85% copper, about 6 to 15% lead, about 2 to 10% tin, about 1 to 4% nickel, about 1 to 4% silicon, and about 0.5 to 2% zinc, the other member comprising a high speed steel containing approximately 0.60% carbon, about 7.5% to 8.5% molybdenum, about 1.25% to 2% tungsten, about 3.5 to 4% chromium, and about 1 to 1¼% vanadium.

6. A brake comprising cooperating members, one of said members comprising an alloy containing 70 to 80% copper, 6 to 15% lead, 2 to 10% tin, 1 to 4% nickel, 1 to 4% silicon, and about 0.5 to 2% zinc, said alloy having been treated at a temperature between 500° C. to 800° C. for a few hours, the other of said members comprising a high speed steel containing from about 4 to 20% of metal of the sixth group of Mendelejeff's Periodic Table of elements and having the property of red hardness.

7. A brake comprising cooperating friction members, one of said members comprising an alloy containing at least 75% of copper, the remainder of said alloy consisting substantially of lead, tin, nickel, silicon and zinc, said alloy having a coefficient of friction of about 0.6, said coefficient of friction being substantially constant.

8. A brake member comprising a support and a layer of copper alloy disposed thereon said alloy consisting of about 75% to 85% copper; about 8% to 12% lead; about 2% to 4% tin; about 2½ to 3½% nickel; about 2½% to 4% silicon and about 0.5% to 2% zinc.

9. A brake comprising cooperating friction members, one of said members comprising an alloy containing at least 75% of copper, the remainder of said alloy comprising appreciable quantities of lead, tin, nickel and silicon, said alloy having a coefficient of friction of at least 0.5, said coefficient of friction being substantially constant.

10. A brake comprising cooperating friction members, one of said members consisting of a heat treated alloy containing at least 75% copper, the remainder of said alloy consisting substantially of appreciable quantities but not more than 12% of lead, 4% tin, 3½% nickel, 3½% silicon and 2% zinc, said alloy having at all times a coefficient of friction of at least 0.5.

11. A brake comprising cooperating friction members, one of said members comprising an alloy containing about 80% copper, 10% lead, 3% tin, 3% nickel, 3% silicon and 1% zinc.

12. A brake comprising cooperating friction members, one of said members comprising an alloy containing about 75% to 85% copper, 8% to 12% lead, 2% to 4% tin, 2½% to 3½% nickel, 2½% to 3½% silicon and 0% to 2% zinc, said alloy having the characteristics of an alloy of the same composition which has been heat treated at a temperature of 500 to 800° C. for a few hours.

IRVING R. VALENTINE.

CERTIFICATE OF CORRECTION.

Patent No. 2,089,080.                                               August 3, 1937.

IRVING R. VALENTINE.

It is hereby certified that error appears in the printed specification of the above numbered patent requiring correction as follows: Page 2, second column, line 45, claim 8, for "$2\frac{1}{2}$" first occurrence, read $2\frac{1}{2}\%$; and same line for "4%" read $3\frac{1}{2}\%$; and that the said Letters Patent should be read with these corrections therein that the same may conform to the record of the case in the Patent Office.

Signed and sealed this 5th day of October, A. D. 1937.

Henry Van Arsdale (Seal)                                         Acting Commissioner of Patents.